United States Patent

Julian

[15] 3,691,211

[45] Sept. 12, 1972

[54] PROCESS FOR PREPARING STEROLS FROM TALL OIL PITCH

[72] Inventor: Donald V. Julian, Colerain Township, Hamilton, Ohio

[73] Assignee: The Procter & Gamble Company, Cincinnati, Ohio

[22] Filed: Dec. 7, 1970

[21] Appl. No.: 95,735

[52] U.S. Cl.............................................260/397.25
[51] Int. Cl...............................................C07c 167/38
[58] Field of Search..................................260/397.25

[56] References Cited

UNITED STATES PATENTS 2,865,934  12/1958  Fisher....................260/397.25

Primary Examiner—Elbert L. Roberts
Attorney—Jack D. Schaeffer and Richard C. Witte

[57] ABSTRACT

Process for preparing sterols from plant sources, especially tall oil pitch, by extraction in a water-alcohol-hydrocarbon mixture followed by saponification and subsequent recrystallization and leaching.

6 Claims, 2 Drawing Figures

PROCESS FOR PREPARING STEROLS FROM TALL OIL PITCH

BACKGROUND OF THE INVENTION

This invention relates to an improved process for the preparation of sterols from the sterol esters found in various plant sources, especially tall oil pitch.

Sterols are high molecular weight alcoholic substances of biological importance. While animal fats and oils may be suitably treated and sterols recovered therefrom, certain plant sources are more attractive natural sources of these complex materials, both by virtue of cost and quantity of sterol present. Too, certain sterols are found only in plants and are not obtainable from animal sources.

Sterols have been isolated from such diverse plant sources as corn oil, wheat germ oil, sarsaparilla root, soybean pitch and corn oil pitch. These latter substances appear to be enriched in sterol content by virtue of the prior treatment of the raw materials from which they are obtained. For example, tall oil pitch is obtained during the process of preparing paper from wood, particularly pine wood, and contains up to 15 percent sterol esters. Tall oil pitch is an extremely complex material comprising rosins, fatty acids, oxidation products and esterified materials, an appreciable fraction of which are sterol esters. As can be seen from the foregoing, these plant sources of sterols are inexpensive in that they are the "foots" or "tailings" left from various manufacturing processes. It is also apparent that these pitches are extremely complex mixtures and that to recover high molecular weight sterols therefrom in good yields and high purities requires superior purification techniques.

Any of the plant oil tailings or pitches, especially those herein described, are suitable sources for sterols when treated in the manner of this invention since all of these sterol sources contain much the same impurities and by-products which must be removed during the sterol recovery process. Chief among these impurities are various saturated and unsaturated high molecular weight acids, such as oleic acid and stearic acid. These acids, themselves, have industrial importance and, as is hereinafter disclosed, good recovery of these acids can be had by the process of this invention and the plant oil pitches thereby made to serve not only as sterol sources, but also as sources for commercially important fatty acids.

High molecular weight alcohols are another type of impurity found in most plant sterol sources. Since the sterols, themselves, are high molecular weight alcohols, their separation from the long-chain alcohol impurities is particularly difficult. The process of this invention is especially suited for removing these undesirable alcoholic materials from the sterols.

Various methods for recovering sterols from plant sources have been disclosed in the prior art. U.S. Pat. 2,835,682, May 20, 1958, to Steiner and Fritz, discloses a process comprising the steps of fractionating the sterol-containing composition in a liquid, normally gaseous hydrocarbon to obtain a sterol-enriched fraction, saponifying the sterol-enriched fraction to hydrolyze the sterol esters present therein and, finally, recovering the sterol. The process uses liquified propane gas and is done under pressure at high temperatures.

U.S. Pat. No. 2,715,638, Aug. 16, 1955, to Albrecht and Herrlinger, discloses a process for recovering sterols from tall oil pitch whereby the fatty acid impurities are removed by a neutralization process. Following this, the sterol esters are saponified; the free sterols are then recovered and washed with isopropanol and dried.

U.S. Pat. No. 2,573,891, Nov. 6, 1951, to Christenson, describes a process for recovering sterols from pitch fractions wherein the removal of unesterified fatty acids is accomplished by extraction with a two-phase solvent system comprising a hydrocarbon fraction and a polar solvent containing water. Because of the two-phase solvent system, it is necessary to employ good mixing or, preferably, counter-current extraction procedures when this method of purification is employed.

It is important to the ultimate purity of the sterols recovered from plant sources (e.g., pitches) that all of the free fatty acids and fatty alcohols be removed therefrom. To achieve maximum sterol yields, it is important that the sterol esters present in the sterol source be completely saponified and broken down into their sterol and acid fragments. Finally, it is important that other impurities present in the sterol source, especially oxidized materials arising from the various manufacturing processes from which these materials are derived, be removed from the sterols. Removal of these various contaminants is particularly important when the sterols are to be ultimately used in medical applications. Perhaps the most difficult impurities to remove from the sterol source are the high molecular weight alcohols and the oxidized materials. Furthermore, the presence of extraneous acids during saponification of the sterol esters results in excessive consumption of caustic and economic waste. The prior art processes for the preparation of sterols from plant sources suffer from various difficulties, including the need for the use of high temperatures and pressures, specialized countercurrent extraction equipment, excessive caustic consumption, incomplete removal of the high molecular weight alcoholic contaminants and the like.

The process of the present invention differs from those of the prior art in that good separation of the free fatty acids from the sterol source is accomplished without recourse to high pressure apparatus and without excessive caustic use. Furthermore, since the organic solvent-sterol solution employed herein is initially homogeneous, it is not necessary to employ countercurrent extraction techniques when practicing this process. Therefore, although this process can be run as a continuous operation, it is especially suitable for batch operations. Also, this process accomplishes the removal of high molecular weight alcohols from the sterols and produces very high purity sterols in high yields.

Accordingly, it is a primary object of the present invention to provide an improved process for the preparation of high purity sterols in high yields from plant sources. It is a further object of this invention to provide a method for removing acids and alcohols from sterols and sterol sources without recourse to the use of high temperatures, pressures or complicated extraction procedures. These and other objects are obtained by the present invention as will become apparent from the following disclosure.

SUMMARY OF THE INVENTION

The present invention relates to a process for preparing sterols from plant sources, especially tall oil pitch, comprising the steps of: (A) acid removal; (B) saponification of sterol esters; (C) sterol recovery; and (D) purification by dissolution and leaching operations, all as hereinafter detailed.

REFERENCE TO DRAWINGS

FIG. 1 is a flow chart depicting the individual operations in the overall process of this invention.

FIG. 2 represents the approximate solubility-temperature relationships of sterols and high molecular weight alcohols in various solvents and relates to the final leaching step of the present process. Curve A demonstrates sterol solubility in methanol; solubility in nitromethane is somewhat lower. Curve B is the solubility curve for the impurities in these solvents, including the high molecular weight alcohols. Curves C and D demonstrate the approximate solubilities of typical sterols in ethanol and iso-propanol, respectively. It is noted that only in methanol and nitromethane is the solubility of the sterols less than that of the impurities such that the impurities can be leached from the sterols. It is further noted that at temperatures above about 70° F, this solubility difference is greatly enhanced, thereby effecting an improvement in the leaching process above this critical temperature.

DETAILED DESCRIPTION OF THE INVENTION

Figure 1:
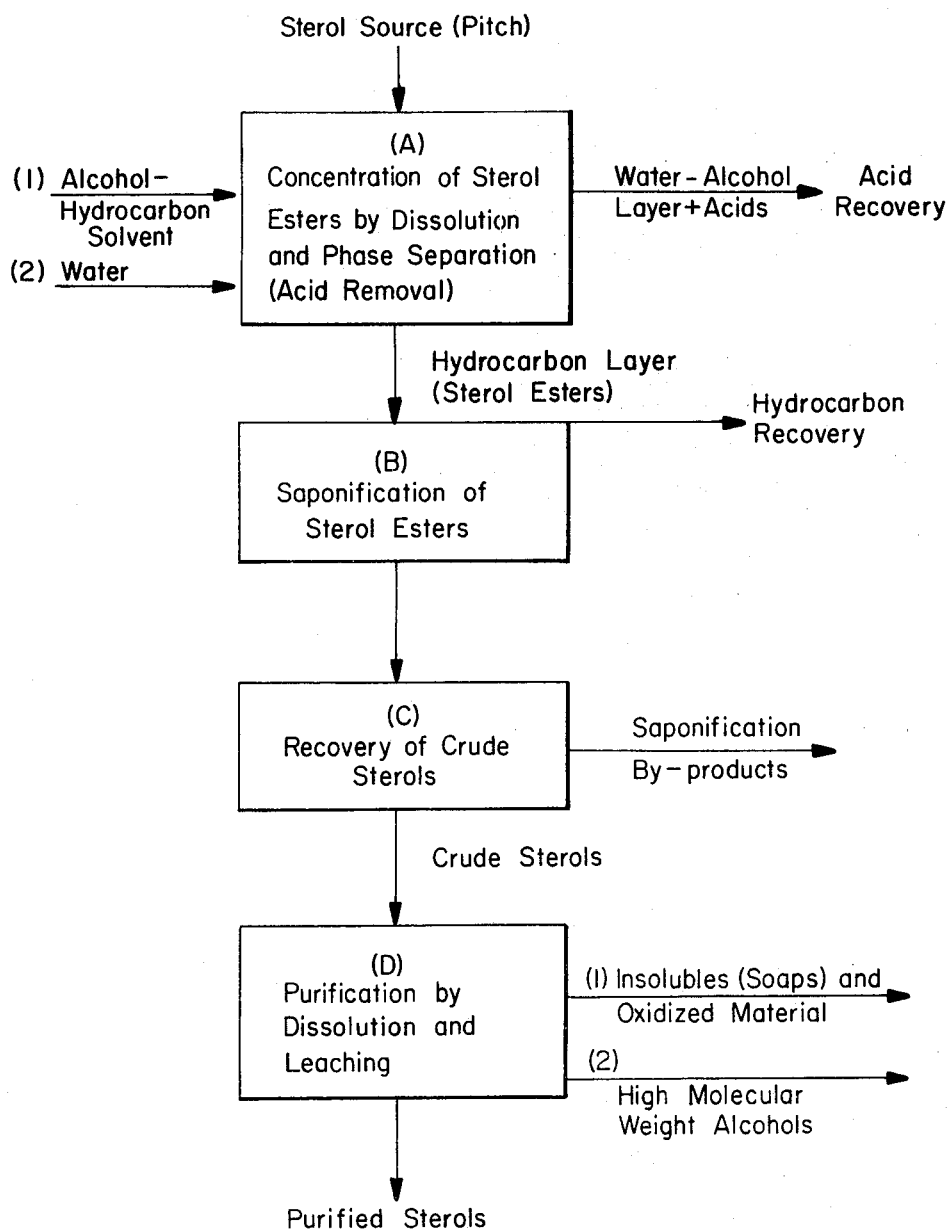

As outlined in FIG. 1, the process of the present invention comprises the steps of: (A) dissolving a plant-derived sterol source (pitch) in a solvent mixture consisting of alcohol and hydrocarbon; adding the proper amount of water; allowing the hydrocarbon phase (which contains the sterol esters) to separate from the water-alcohol phase (which contains the acids); (B) saponifying the sterol esters obtained from the hydrocarbon phase of step (A) with base under the conditions hereinafter detailed; (C) recovering the sterols; and (D) dissolving the sterols in a solvent, recovering the sterols and leaching the sterols with methanol or nitromethane at a temperature within a critical range.

STEP A

Separation of Sterol Esters and Acids

One critical aspect of the present process is the alcohol-hydrocarbon solvent employed in step (A) for removing the acids from the plant sterol source. Proper selection of the organic components of this solvent mixture and the relative ratios thereof results in a homogeneous solution when the sterol source is dissolved therein. When water is added to this homogeneous solution it separates into two layers, (1) the water-alcohol layer in which the fatty acids are dissolved and (2) the hydrocarbon layer wherein the sterol esters are dissolved. Thus, by using properly formulated mixed organic solvents this step in the preparation of pure sterols from plant pitches, to wit, the removal of the fatty acids, is readily achieved. Organic solvent mixtures which are liquid at room temperatures and atmospheric pressures can be selected so that the need for special pressure vessels and gas liquifying apparatus is obviated.

The mixed solvents used in step (A) are mixtures of alcohols and hydrocarbons as described below and are initially immiscible. However, when the sterol source is dissolved in these solvents they become miscible and a homogeneous system is formed. This homogeneous system is separated into two phases (water-alcohol and hydrocarbon) when water is added in the proportions hereinafter noted. The use of such homogeneous, water-separable solutions allows the separation and removal of fatty acids from the sterol source without recourse to the countercurrent extraction procedures needed when two-phase solvents are employed in this step. Hence, step (A) of the instant process can be conveniently done in a simple batch operation, if so desired; alternatively, standard continuous extraction processes can be employed with these mixed solvents.

The hydrocarbons suitable for use in step (A) of this process include liquid branched-chain, straight-chain and cyclic hydrocarbons containing from about five to about 20 carbon atoms and mixtures thereof, for example, kerosenes, petroleum ethers, light mineral oils and the like. Lower molecular weight hydrocarbons, such as methane, ethane, propane and butane can be employed in this step but must be used in the liquified state, i.e., under pressure, and are therefore not preferred. Exemplary hydrocarbons suitable for use in the mixed solvent of step (A) are pentane, hexane, heptane, octane, nonane, decane, undecane, dodecane, tridecane, tetradecane, pentadecane, hexadecane, heptadecane, octadecane, nonadecane, eicosane, 2-methylpentane, 2-methylhexane, 3-ethylheptane, 3-ethyloctane, 2,3-dimethylnonane, 3,4-diethyl-decane, isooctane, cyclopentane, cyclohexane, cyclodecane and mixtures of these hydrocarbons. Benzene, toluene and the xylenes are also suitably employed as the hydrocarbon component of the hydrocarbon-alcohol solvent used herein in step (A). An especially preferred hydrocarbon component of the mixed organic solvent used in step (A) to remove the acids from the vegetable sterol sources is hexane. Kerosene and petroleum ethers, both "high" and "low" boiling, are also preferred.

Alcohols suitable for use herein in step (A) include those alcohols containing from one to about six carbon atoms, more preferably from one to about three carbon atoms. Non-limiting examples of alcohols suitable for such use include methanol, ethanol, propanol, isopropanol, butanol, t-butanol, pentanol, hexanol and isohexanol. Especially preferred alcohols for use in the fatty acid removal step (A) of the present process are methyl alcohol and ethyl alcohol.

Preferred mixed alcohol-hydrocarbon solvents used herein in step (A) include hexane-methanol, kerosene-methanol, petroleum ether-ethanol, petroleum ether-methanol and hexane-ethanol. The ratio of alcohol:hydrocarbon in the mixed solvent can range from about 5:1 to 1:5 and is preferably about 1:1 on a weight basis.

As is noted above, these solvent mixtures are initially heterogeneous and become homogeneous when the sterol source is dissolved therein. Water, in the proper proportions, is then used to cause a phase separation in the homogeneous system comprising the sterol source, alcohol and hydrocarbon. If too much water is used to effect the phase separation, long-chain acids will be partitioned into the hydrocarbon phase along with the sterol and the purification efficiency is decreased. If too little water is used, incomplete phase separation results and some sterol esters remain with the alcohol-water phase and are lost. The amount of water used to cause a separation of the alcohol-hydrocarbon-sterol source solution is fairly critical and is within the range from about 0.5 percent by weight of alcohol to about 10 percent by weight of alcohol, more preferably from about 1.5 to about 6 percent, by weight of alcohol present in the mixed hydrocarbon-alcohol solvent.

The ratio of solvent to plant pitch in step (A) is not critical and can be in the range of about 50:1 to about 2:1, more preferably from about 15:1 to about 5:1. Higher solvent-to-pitch ratios could be employed but the percentage of acid extracted does not show a corresponding increase. In a commercial process it is best to avoid large excesses of solvent so as to minimize handling and recovery problems. Lower solvent:pitch ratios result in inconveniently slow dissolution of pitch.

The extraction procedure used to remove free acids from the sterol esters involves dissolving the plant pitch in the organic solvent mixture, whereupon, after addition of water, the solvent separates into an upper, hydrocarbon layer which contains the sterol esters and a lower, alcohol-water phase containing the acids. The layers are then separated mechanically. The hydrocarbon is evaporated to yield nearly acid-free sterol esters and the hydrocarbon can be recovered for reuse. The alcohol-water layer containing the fatty acid can be evaporated and the acids and alcohols thereby separated and recovered.

Step (A) of this invention can be performed at any convenient temperature, most generally from about 32°F to about 212°F, more preferably from about 32°F to about 90°F. Obviously, at the higher temperatures many of the hydrocarbons would be lost by evaporation and when such high temperatures are employed the reaction should be done in a sealed vessel. Operating pressures are not critical in step (A), or in any of the subsequent steps of the present process.

STEP B

Saponification of Sterol Esters

Step (B) of the present process involves the saponification of the sterol esters recovered from the hydrocarbon layer from step (A) with base and comprises charging the partially purified sterol esters from step (A), base and a saponification solvent into a reaction vessel and heating this mixture at an appropriate temperature for an appropriate period of time, all as hereinafter detailed. The requirements for the saponification solvent used in step (B) are: (1) it must solubilize the reactants; (2) it must be inert to the reactants; and (3) it must be easily recoverable. Furthermore, if the sterols are to be ultimately used in medical or food products, the saponification solvents employed should be suitable for food processing, i.e., non-toxic and innocuously flavored. The lower alcohols, e.g., methanol, ethanol, isopropanol, etc., fulfill these solvent requirements and are suitable for use as the saponification solvent in step (B) and are convenient in that the free sterols resulting from the saponification are relatively insoluble therein and readily separable. Methanol is especially preferred for this use.

The base used in the saponification of the sterol esters can be any of the alkali metal bases, i.e., lithium hydroxide, sodium hydroxide, potassium hydroxide, rubidium hydroxide and cesium hydroxide, with sodium hydroxide and potassium hydroxide being preferred from a cost standpoint. Lime (calcium oxide), although a less expensive source of caustic, is not suitable since calcium soaps are formed and these are insoluble in the system and contaminate the product.

The amount of base used in the saponification appears to effect the time needed for the completion of the reaction. A 0.1-fold to 4-fold molar excess of base can be employed in the saponification with about a 0.7-fold to about a 1-fold molar excess being preferred. To demonstrate the time differential when various amounts of base are employed, 30 minutes are required to completely saponify sterol esters using a 3.5-fold molar excess of base, compared with 1.5 hours' reaction time using a 1-fold molar excess of base, when the reaction is run at 300°F.

While the sterol esters can be saponified with excess base over a temperature range of from about 90°F to about 500°F, temperatures in the lower portion of this range are not satisfactory to effect complete hydrolysis of said esters and economic loss of unsaponified sterol esters is incurred if the lower temperatures within this range are employed in the saponification. Therefore, it is more preferable to employ temperatures above 300°F to effect the saponification. It is rarely necessary to exceed 500°F to insure completion of this saponification; hence a saponification temperature in the range from 300°F to 500°F is preferred herein and is critical if optimum product yields are to be achieved. Of course, at these higher temperatures a closed reaction vessel must be used to contain the alcohol solvent. Pressures in the closed vessels will range from about 100 p.s.i.a. to about 1,500 p.s.i.a. due to the containment of the solvent vapors at these temperatures. However, these pressures are not critical and do not affect the course of the reaction. The time of the reaction is not critical thereto and can range from a few minutes to a few hours. As noted hereinabove, almost 100 percent saponification of the sterols can be achieved in 30 minutes at 300°F using a 3.5-fold molar excess of base and it is unnecessary to exceed this time greatly. Good, but not quantitative, yields of free sterol can be achieved under these conditions in from 2 to 10 minutes if speed of the reaction, rather than total sterol recovery, is the primary consideration.

STEP C

Recovery of Crude Sterols

Step (C) of the present process involves the separation of the free sterols from the alcoholic saponification reaction mixture. Sterols are, in general, relatively insoluble in alcohols and can be recovered by standard filtration and centrifugation techniques. After separation, the sterols can, optionally, be washed with water. Improved recovery of the sterols can be had if a little water is added to the alcoholic saponification mixture upon completion of the saponification reaction since the sterols are less soluble in aqueous-alcohol than in pure alcohol. However, it must be noted that adding a large quantity of water before centrifuging or filtering the sterols increases the sterol recovery but also causes more impurities such as long-chain fatty acids to precipitate and contaminate the sterols. It is to be understood that quite good sterol recoveries can be achieved from any of the alcohols disclosed herein for use as the saponification solvent, but that when from about 5 percent to about 20 percent water (by weight of alcohol) is added to the saponification mixture, better yields of sterol are secured since the sterols are less soluble in aqueous-alcohol than in pure alcohol.

STEP D

Purification

Step (D) of the present process is designed to remove metal soaps, oxidation products and high molecular weight alcohols from the sterols. This final purification step (D) comprises two stages and leads to sterols of very high purity. In the first stage the wet, solid sterols from step (C) are preferably dried. This can be accomplished, for example, by spray or roll drying, the advantage of spray drying being that the dry solids will have a high surface area for dissolution in the next process step. (Alternatively, the sterols can be used wet, but this leads to operational difficulties and solvent contamination.) The solids are then contacted with a solvent, the only requirement of such solvent being that the sterols are soluble therein and that soaps, i.e., the salts of fatty acids, are insoluble therein. Following dissolution of the sterols and high molecular weight alcohols in said solvent, the insolubles (soaps, etc.) are removed physically, i.e., by centrifugation, filtration, skimming, etc. The solvent is then evaporated to yield fairly pure sterols contaminated with some high molecular weight alcohols.

When performing this first stage of the purification step (D), it is not necessary that any particular dissolution temperature be used. However, it will be recognized that the sterols dissolve more rapidly, and the process is thereby speeded, when the solvent is heated. It is therefore preferred that the dissolution of the sterol in the solvent be done with the solvent refluxing at atmospheric pressure. As is hereinbefore noted, the solvent used in the first stage of step (D) is selected so that the sterols are soluble therein and any soaps and oxidized materials are insoluble. It is understood that there are a wide variety of polar, aprotic organic solvents having these necessary solubilizing characteristics, among which are included the halogenated hydrocarbons, carbonyl compounds, especially ketones, and a variety of other organic materials such as the N,N-dialkyl-amides, for example dimethylformamide. The most preferred solvents for dissolving the sterols, thereby separating them from the insoluble soaps, are acetone, methyl ethyl ketone and ethylene dichloride.

Figure 2:
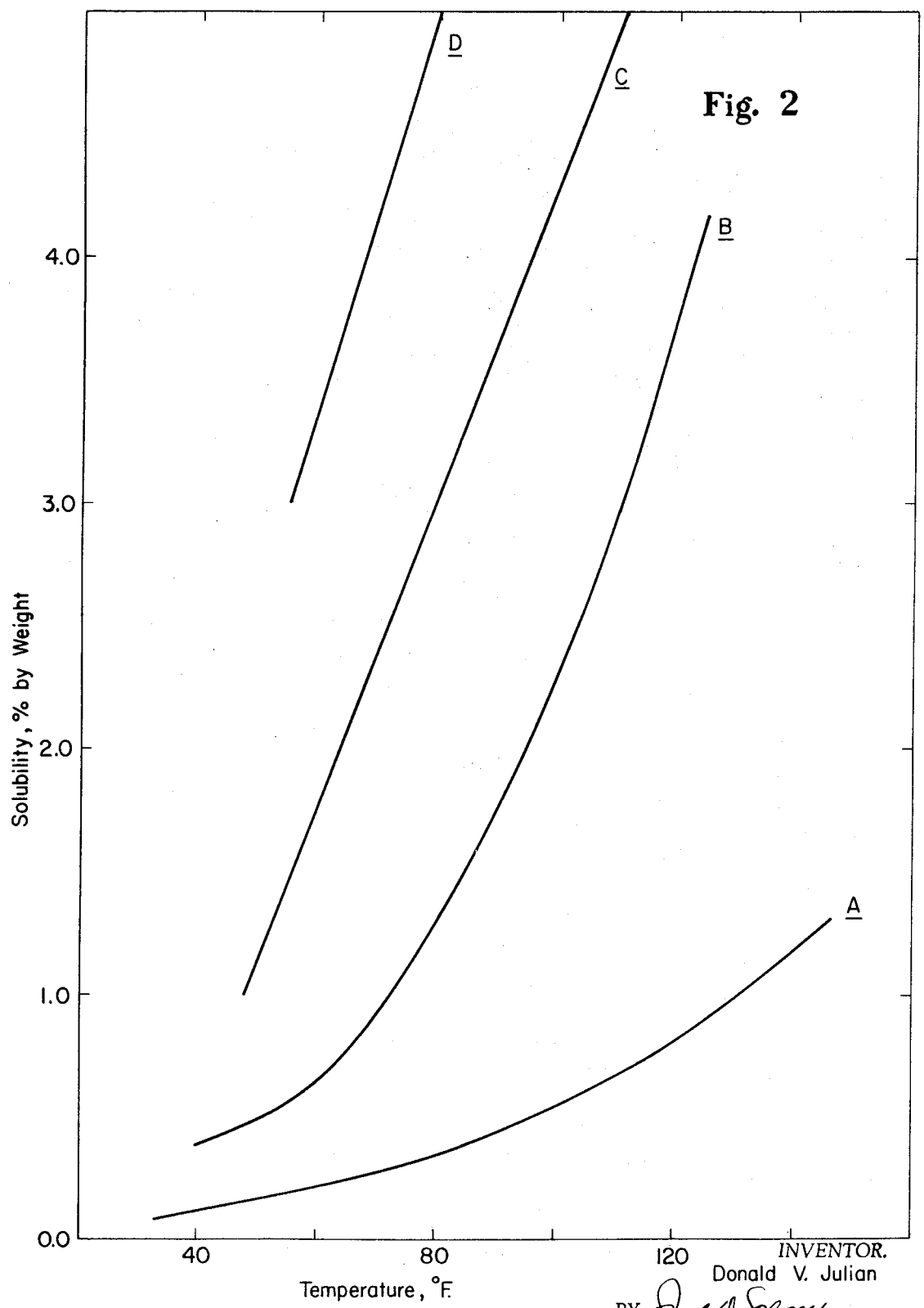

The second stage involved in the purification step (D) is the removal of any high molecular weight alcohols and other minor contaminants copresent with the sterols by a leaching process whereby these contaminants are selectively dissolved, and the pure, insoluble sterols are retained. As is hereinbefore noted, this leaching stage of step (D) is complicated by the fact that the high molecular weight alcohols are chemically similar to the sterols and it is, therefore, difficult to separate these materials. To prepare sterols of the highest purity by removal of the high molecular weight alcoholic contaminants it is necessary to employ a critical solvent. To this end, advantage is taken of the fact that said alcohols and oxidation product contaminants are mainly polar materials which are soluble in certain polar materials such as alcohols or nitromethane. However, as is noted by reference to FIG. 2, the sterols are more soluble than the alcoholic impurities in the higher alcohols and, thus, the only alcohol suitable for purifying the sterols by this leaching process is methanol. As is further noted in FIG. 2, the solubility differences between the contaminating high molecular weight alcohols and the sterols in methanol and nitromethane is accentuated over certain temperature ranges having no apparent upper limit. Hence, methanol or nitromethane can be used at temperatures above about 70°F to remove the high molecular weight alcohols and other impurities; the pure sterols, which are relatively insoluble at these temperatures and in these solvents, are retained.

The leaching stage of step (D) of the present process is carried out by contacting the solid sterols with methanol or nitromethane at a temperature above about 70°F, conveniently 70°F to 300°F, more preferably from 70°F to about 140°F; pressure vessels can be employed and the leaching pressure is not critical. The solvents are then removed, hot, along with the dissolved contaminating high molecular weight alcohols. This leaching can be repeated, as necessary. Alternatively, automatic extraction equipment can be used in this stage at the temperature ranges detailed to provide continuous removal of the contaminating high molecular weight alcohols from the sterols. Following this, the pure solid sterols allowed to dry, and the process is complete.

As is hereinbefore noted, any of the common plant sources of sterol esters can be employed in this process, with the various pitches and tailings being preferred, since all of these sterol sources contain much the same impurities. Non-limiting examples of sterol ester-containing plant sources suitable for use herein are: tall oil pitch, crude tall oil, sugar cane oil, hot well skimmings, cottonseed pitch, soybean pitch, corn oil pitch, wheat germ oil and rye germ oil; preferred is tall oil pitch.

The following examples serve to illustrate the present process but are not intended to be limiting thereof.

EXAMPLE I

Step A

Tall oil pitch (30.3 lbs.) was dissolved in hexane (121 lbs.) with heating and mixing and then mixed with methanol (119 lbs.) with a nitrogen sparge; the ratio of solvent to pitch was 8:1 ; water (2.3 lbs.) was then added. The lower layer (acid phase) which formed on standing was drawn-off after the mixture had stood overnight at 70°F.

Step B

The hexane was stripped from the upper ester layer under vacuum and the solids were charged into an autoclave with sodium hydroxide (3.4 lbs.) and methanol (22.8 lbs.). The reaction mixture was heated at 300°F for 1.5 hours with continuous stirring.

Step C

The saponified mixture was diluted with water (86 lbs.) and methanol (71 lbs.) and gently mixed in a 55 gal. drum for 1 hour at 55°F. This mixture was then pumped through a basket centrifuge (hold time ≈2 min. at 500 g) twice. The solids were then slurried in water, cooled to 55°F, and centrifuged first through the basket centrifuge, then through a Sharples high speed centrifuge (one-half min. at 17,000 g). The recovered solids were dried in a vacuum oven at 130°F.

Step D

The dried, centrifuged solids were refluxed in methyl ethyl ketone (MEK) for 45 minutes. The mixture was loaded into bottles and centrifuged hot (about 60°C) for 10 minutes at 600 g. The insolubles were discarded. The liquid phase was stripped of MEK and the residue was dried in a vacuum oven.

The dried residue from the MEK solution was refluxed in methanol for 1 hour. The slurry was then filtered at 60°C and the filter cake washed with cold methanol. The leached solids (filter cake) were dried in a vacuum oven. Analysis indicated that the recovered solids were 92 percent free sterol with an 80 percent overall recovery of sterol. The sterols obtained in this fashion proved to be predominately β-sitosterol and campesterol.

In the above process the tall oil pitch is replaced by an equivalent amount of crude tall oil, sugar cane oil, hot well skimmings, cottonseed pitch, soybean pitch, corn oil pitch, wheat germ oil, rye germ oil, and sarsaparilla root and equivalent results are obtained in that free sterols, especially β-sitosterol, are recovered in good yields and high purities and are free from contaminating carboxylic acids and high molecular weight alcohols.

EXAMPLE II

Step A

Tall oil pitch (5 lbs.) is dissolved in high boiling petroleum ether (35 lbs.) with heating and methanol (35 lbs.) is added thereto. The resulting homogeneous mixture is separated by the addition of water (0.7 lbs.) which causes two layers to separate. The lower layer is drawn-off and the petroleum ether layer containing the sterol esters is retained.

Step B

The petroleum ether is stripped from the sterol ester layer by distillation and the resulting solids are dissolved with 0.5 lbs. of sodium hydroxide (about a 1-fold molar excess) and methanol (1.5 lbs.) in an autoclave and heated at 400°F for 1 hour with continuous stirring.

Step C

The saponified mixture from (B) is diluted with water (0.3 lbs.) and some additional methanol (5 lbs.) The solids are removed by filtration and dried under forced air at 120°F.

Step D

The dried solids are refluxed in ethylene dichloride and filtered hot through a fritted glass disk. The insolubles (soaps) are discarded and the liquid phase is evaporated; the residue is dried at room temperature.

The dried residue from the ethylene dichloride solution is refluxed in nitromethane for one hour and filtered hot (about 60°C) and the filter cake washed with cold nitromethane. The leaching procedure is repeated by suspending the solids in refluxing methanol for about 30 minutes. Following this, the solids are recovered by filtration (hot — about 60°C) and dried in a vacuum oven to provide sterols, which are about 95 percent pure, i.e., free from oxidation by-products, high molecular weight acids, and high molecular alcohols. The sterols so obtained comprise a mixture of about 92 percent β-sitosterol and 8 percent campesterol.

In step (A) of the above process the high boiling petroleum ether is replaced by an equivalent amount of low boiling petroleum ether, kerosene, light mineral oil, pentane, heptane, tridecane, pentadecane, eicosane, and mixtures thereof and equivalent results are obtained in that good separation of the fatty acids from the sterol source is achieved upon addition of from 0.5 percent to 6 percent water, based on alcohol.

In step (A) of the above process the methanol is replaced with an equivalent amount of ethanol, propanol, isopropanol, butanol, t-butanol, pentanol, hexanol and isohexanol, respectively, and equivalent results are obtained in that good separation of the fatty acids from the sterol source is achieved upon addition of 0.5 percent to 10 percent water, based on alcohol.

In step (A) of the above process the high boiling petroleum ether-methanol solvent is replaced by a 5:1 (wt.) hexane-methanol solvent, a 1:1 (wt.) hexane-methanol solvent, a 1:5 (wt.) hexane-methanol solvent, a 5:1 (wt.) kerosene-methanol solvent, a 1:5 kerosene-methanol solvent, a 5:1 (wt.) petroleum ether-ethanol solvent, a 1:5 petroleum ether-methanol solvent, a 1:1 hexane-hexanol solvent, a 5:1 benzene-propanol solvent, a 1:5 (wt.) hexane-ethanol solvent, a 1:1 petroleum ether-methanol solvent, a 5:1 petroleum ether-methanol solvent and a 1:1 hexane-ethanol solvent, respectively, and good separation of the fatty acids is achieved upon addition of from 0.5 to 10 percent water, based on alcohol.

In step (B) of the above process the sodium hydroxide is replaced by about a 0.7-fold to 1.0-fold molar excess of lithium hydroxide, potassium hydroxide, rubidium hydroxide, and cesium hydroxide, respectively, and the saponification of the sterol esters is carried out at temperatures of 90°F, 120°F and 500°F, respectively, for periods of 0.1, 0.2, 2 and 5 hours, respectively. Equivalent results are obtained in that the sterol esters are converted to the free sterols which are highly pure by virtue of the treatments provided in steps (A), (C) and (D). Total sterol yields so obtained at temperatures of 90°C and 120°C are about 60 percent, based on original sterol esters. At the higher saponification temperatures, essentially 80–90 percent yields of sterols are obtained.

In step (B) of the above process the methanol saponification solvent is replaced by an equivalent amount of ethanol, propanol, isopropanol, butanol, t-butanol, pentanol and hexanol, respectively, and equivalent results are obtained in that the sterol esters are saponified.

In step (C) of the above process, water is added to the saponification mixture following completion of the saponification to aid in separation of the sterol. When 0.10, 0.25 and 0.30 pounds of water, respectively, are so added, the sterols solidify more rapidly and in somewhat greater quantities than from the pure alcoholic saponification solvent.

In step (D) of the above process the ethylene dichloride used to dissolve the sterols and remove the insolubles is replaced by acetone, ethyl acetate, dimethylformamide, trichloroethylene, and methyl ethyl ketone, respectively, with equivalent results.

In step (D) of the above process the leaching is done at 70°F, 100°F, 140°F, 300°F and 500°F (using pressure vessels), respectively, and the sterol is purified.

In step (D) the nitromethane is replaced with methanol and the leaching is carried out at 70°F, 100°F, 140°F and 300°F, respectively, and the high molecular weight alcohol contaminants are removed from the sterols.

What is claimed is:

1. A process for preparing sterols from plant sources comprising the steps of: (A) dissolving a plant-derived sterol source in a solvent mixture comprising an alcohol containing from about one to about six carbon atoms and a liquid hydrocarbon, and adding water in an amount from about 0.5 to about 10 percent by weight of alcohol and allowing the phases to separate; (B) saponifying the sterol esters obtained from the hydrocarbon phase of step (A) with an alkali metal base at a temperature from about 90°F to about 500°F in a lower alcohol solvent; and (C) dissolving the sterols obtained from step (B) in a polar, aprotic organic solvent in which soaps are insoluble, discarding said soaps, recovering the sterols from the solvent and leaching the sterols with a solvent selected from the group consisting of methanol and nitro-methane at a temperature above about 70°F.

2. A process according to claim 1 wherein the plant source of the sterol is a member selected from the group consisting of tall oil pitch, crude tall oil, sugarcane oil, hot well skimmings, cottonseed pitch, soybean pitch, corn oil pitch, wheat germ oil and rye germ oil.

3. A process according to claim 1 wherein the alcohol used in step (A) is selected from the group consisting of methanol and ethanol and the liquid hydrocarbon used in step (A) is selected from the group consisting of hexane, kerosene, and petroleum ether.

4. A process according to claim 1 wherein about a 0.7-fold to about a 1.0-fold molar excess of alkali metal base is used in the saponification step (B) and the saponification is carried out at a temperature from about 300°F to about 500°F.

5. A process according to claim 1 wherein the polar, aprotic organic solvent used in step (D) to dissolve the sterols and separate the soaps therefrom is selected from the group consisting of methyl ethyl ketone, acetone and dichloromethane.

6. A process according to claim 1 wherein the solvent used in the leaching operation of step (D) is methanol and the leaching is carried out at temperatures from about 70°F to about 140°F.

* * * * *